(12) United States Patent
Okazaki

(10) Patent No.: US 10,150,181 B2
(45) Date of Patent: Dec. 11, 2018

(54) SEPARATION AND RECOVERY APPARATUS AND METHOD OF TAKING OUT COMPONENT USING SAME

(71) Applicant: HITACHI ZOSEN FUKUI CORPORATION, Awara-shi, Fukui (JP)

(72) Inventor: Akira Okazaki, Awara (JP)

(73) Assignee: HITACHI ZOSEN FUKUI CORPORATION, Awara-shi, Fukui (JP)

(*) Notice: Subject to any disclaimer, the term of this patent is extended or adjusted under 35 U.S.C. 154(b) by 385 days.

(21) Appl. No.: 15/107,787

(22) PCT Filed: Jan. 28, 2015

(86) PCT No.: PCT/JP2015/000360
§ 371 (c)(1),
(2) Date: Jun. 23, 2016

(87) PCT Pub. No.: WO2015/118837
PCT Pub. Date: Aug. 13, 2015

(65) Prior Publication Data
US 2016/0318126 A1    Nov. 3, 2016

(30) Foreign Application Priority Data

Feb. 7, 2014   (JP) ................ 2014-022898

(51) Int. Cl.
*B23K 26/16* (2006.01)
*B23K 26/38* (2014.01)
(Continued)

(52) U.S. Cl.
CPC .......... *B23K 26/16* (2013.01); *B23K 26/0838* (2013.01); *B23K 26/0876* (2013.01); *B23K 26/38* (2013.01); *B23K 2101/18* (2018.08)

(58) Field of Classification Search
CPC .... B23K 26/16; B23K 26/38; B23K 26/0838; B23K 26/0876
(Continued)

(56) References Cited

U.S. PATENT DOCUMENTS 6,204,469 B1* 3/2001 Fields, Jr. ............ B23K 26/032
                                                            219/121.6
6,509,545 B1* 1/2003 Klingel ................. B23K 26/10
                                                            219/121.67
(Continued)

FOREIGN PATENT DOCUMENTS

JP     S59004930 A     1/1984
JP     H01140996 A    6/1989
(Continued)

OTHER PUBLICATIONS

International Search Report of PCT/JP2015/000360.

*Primary Examiner* — Samuel M Heinrich
(74) *Attorney, Agent, or Firm* — Muncy, Geissler, Olds & Lowe, P.C.

(57) ABSTRACT

To provide a separation and recovery apparatus and a method of taking out a component using the same, the apparatus being capable of dividing a sheet material into a component, an inner offcut located inside the component, and a marginal offcut located on an edge side of the component, and efficiently continuously taking out the component among them.
The present invention is a separation and recovery apparatus 100 and a method of taking out the component X1 using the same, the apparatus being provided with: a laser blanking apparatus 10 cutting a flat plate-like sheet material with a laser beam and dividing the sheet material into a component X1, an inner offcut X2 located in isolation inside the component X1, and a marginal offcut X3 opened and located on an edge side of the component; a first transporting
(Continued)

conveyor 20 dropping the marginal offcut X3 into a scrap chute P while transporting the component X1, the inner offcut X2, and the marginal offcut X3; a robot 30 taking out and removing the inner offcut X2 on the first transporting conveyor 20; and a second transporting conveyor 40 transporting the component X1.

12 Claims, 11 Drawing Sheets

(51) Int. Cl.
*B23K 26/08* (2014.01)
*B23K 101/18* (2006.01)
(58) Field of Classification Search
USPC .................................... 219/121.67, 121.72
See application file for complete search history.

(56) References Cited

U.S. PATENT DOCUMENTS

| | | |
|---|---|---|
| 2008/0230523 A1 | 9/2008 | Graf |
| 2009/0212033 A1 | 8/2009 | Beck et al. |
| 2017/0259376 A1* | 9/2017 | Beransky ........... B23K 26/0838 |

FOREIGN PATENT DOCUMENTS

| | | |
|---|---|---|
| JP | H08267155 A | 10/1996 |
| JP | 2000153427 A | 6/2000 |
| JP | 2001062800 A | 3/2001 |
| JP | 2007319893 A | 12/2007 |
| JP | 2010502442 A | 1/2010 |
| JP | 2010253589 A | 11/2010 |
| JP | 2011512259 A | 4/2011 |
| JP | 4705139 B2 | 6/2011 |

* cited by examiner

SEPARATION AND RECOVERY APPARATUS AND METHOD OF TAKING OUT COMPONENT USING SAME

TECHNICAL FIELD

The present invention relates to a separation and recovery apparatus and a method of taking out a component using the same, and in particular to a separation and recovery apparatus capable of continuously separating and recovering a laser-processed component from a flat plate-like sheet material and a method of taking out a component using the same.

BACKGROUND ART

Laser processing attracts attention as a method of cutting a sheet material.

In the laser processing, there is such an advantage that a sheet material can precisely be cut into a desired shape by using a laser beam and programmatically controlling the motion of the laser beam, and a burr hardly occurs.

Further, a laser-processed component is taken out in various ways.

As the method for taking out component, for example, a taking-out method in which a sheet material is thermally cut into a product and a peripheral residual offcut by a laser cutting mechanism, the peripheral residual offcut drops by its own weight from the periphery of a placing portion and is recovered into a container, while the product cut off of a brittle sheet to be processed is sucked and held by a robot arm, moved to a discharge conveyor, and transported by the discharge conveyor is known (for example, see patent literature 1).

In addition, a separation and recovery apparatus that is disposed downstream from a laser cutting apparatus, and that separates and recovers a product component and a scrap component which are cut components is known (for example, see patent literature 2). Such a separation and recovery apparatus is provided with a transporting means, a transferring member transported by the transporting means, a sucking means installed in the transferring member to suck the product component, a pressing means installed in the transferring member to press down the scrap component, and a controlling means controlling suction/release of the sucking means.

CITATION LIST

Patent Literature

PTL 1: Japanese Patent Application Laid-Open No. 2007-319893
PTL 2: Japanese patent No. 4705139

SUMMARY OF INVENTION

Technical Problem

However, it cannot be said necessarily that the taking-out method described in Patent Literature 1 and the separation and recovery apparatus described in Patent Literature 2 are efficient in taking out components continuously. Particularly, when a sheet material is divided into a component, an inner offcut located inside the component, and a marginal offcut located on an edge side of the component, taking-out itself is difficult.

The present invention has been made in view of these circumstances, and an object thereof is to provide a separation and recovery apparatus capable of dividing a sheet material into a component, an inner offcut located inside the component, and a marginal offcut located on an edge side of the component and efficiently continuously taking out the component between the inner offcut and the marginal offcut and a method of taking out a component using the same.

Solution to Problems

The present inventor has made study keenly to solve the above problem and has reached the completion of the present invention on the basis of such a finding that the above problem can be solved by installing a laser blanking apparatus cutting a flat plate-like sheet material with a laser beam, a first transporting conveyor dropping a marginal offcut into a scrap chute, and a robot taking out and removing an inner offcut.

The present invention lies in (1) a separation and recovery apparatus provided with: a laser blanking apparatus cutting a flat plate-like sheet material with a laser beam and dividing the sheet material into a component, an inner offcut located in isolation inside the component, and a marginal offcut opened and located on an edge side of the component; a first transporting conveyor dropping the marginal offcut into a scrap chute while transporting the component, the inner offcut, and the marginal offcut; a robot taking out and removing the inner offcut on the first transporting conveyor; and a second transporting conveyor transporting the component.

The present invention lies in (2) the separation and recovery apparatus according to the above aspect (1), wherein the second transporting conveyor is composed of a first electromagnetic conveyor magnetically attracting the component to a lower face, and a second electromagnetic conveyor receiving the component handed from the first electromagnetic conveyor and magnetically attracting the component to a lower face, wherein the first electromagnetic conveyor transports the component in continuous operation, and wherein the second electromagnetic conveyor transports the component in intermittent operation.

The present invention lies in (3) the separation and recovery apparatus according to the above aspect (2), further including a placing platform for placing the component dropped in a predetermined position from the second electromagnetic conveyor.

The present invention lies in (4) the separation and recovery apparatus according to any one of the above aspects (1) to (3), further including a scrap separation conveyor capable of dropping the inner offcut between the first transporting conveyor and the second transporting conveyor, wherein the component is handed from the scrap separation conveyor to the second transporting conveyor.

The present invention lies in (5) the separation and recovery apparatus according to any one of the above aspects (1) to (4), wherein the inner offcut is cut into a separate component and a residual offcut, and wherein the robot grasps the separate component and the residual offcut, and recovers the separate component while dropping the residual offcut into the scrap chute.

The present invention lies in (6) the separation and recovery apparatus according to any one of the above aspects (1) to (5), further including a washing machine for washing the component between the laser blanking apparatus and the first transporting conveyor.

The present invention lies in (7) the separation and recovery apparatus according to any one of the above aspects (1) to (6), wherein the laser blanking apparatus is provided with: a laser nozzle emitting a laser beam to the sheet material; a pair of upstream support roller and downstream support roller installed below the laser nozzle; a pull-in roller installed below the upstream support roller and the downstream support roller; and an endless conveyor guided by the upstream support roller, the downstream support roller, and the pull-in roller to transport the sheet material, and wherein the laser beam is emitted to the sheet material from the laser nozzle while the laser nozzle is being moved, and the upstream support roller, the downstream support roller, and the pull-in roller are made to follow the movement of the laser nozzle.

The present invention lies in (8) the separation and recovery apparatus according to the above aspect (7), wherein an x-axis rail is attached above the endless conveyor orthogonally to an advancing direction of the endless conveyor, wherein y-axis rails are attached on both right and left ends of the endless conveyor along the advancing direction of the endless conveyor, wherein the laser nozzle is capable of moving while being guided on the x-axis rail, and wherein the x-axis rail is capable of moving while being guided on the y-axis rails.

The present invention lies in (9) the separation and recovery apparatus according to the above aspect (7) or (8), wherein a spatter receiving box is installed between the upstream support roller and the downstream support roller.

The present invention lies in a component-taking-out method of taking out a laser-processed component from a flat plate-like sheet material using the separation and recovery apparatus according to any one of the above aspects (1) to (9), including: a laser processing step of cutting the sheet material with a laser beam and dividing the sheet material into a component, an inner offcut located in isolation inside the component, and a marginal offcut opened and located on an edge side of the component; a first transporting step of transporting the component, the inner offcut, and the marginal offcut; a dropping step of dropping the marginal offcut while transporting the component; a removing step of removing the inner offcut by means of a robot while transporting the component; and a second transporting step of transporting the component, wherein the laser processing step, the first transporting step, and the dropping step are performed in continuous operation.

The present invention lies in (11) the method of taking out component according to the above aspect (10), further including a piling step of dropping and piling components.

The present invention lies in (12) the method of taking out component according to the above aspect (10) or (11), wherein the laser processing step is performed while the sheet material is being transported.

Advantageous Effects of Invention

Since the separation and recovery apparatus of the present invention includes the laser blanking apparatus cutting a flat plate-like sheet material with a laser beam, the flat plate-like sheet material can be cut into a component having a desired shape, an inner offcut, and a marginal offcut.

Further, since the first transporting conveyor drops the marginal offcut into the scrap chute, and the robot takes out and removes the inner offcut, the component can be taken out efficiently continuously.

In the separation and recovery apparatus of the present invention, when the second transporting conveyor is composed of a first electromagnetic conveyor and a second electromagnetic conveyor, for example, it is possible to transport the component handed from the first transporting conveyor in continuous operation on the first electromagnetic conveyor while adjusting the transportation speed, and transporting the component handed from the first electromagnetic conveyor in intermittent operation on the second electromagnetic conveyor. That is, the first electromagnetic conveyor adjusts the transportation speed, thereby making it possible to transport the component in intermittent operation on the second electromagnetic conveyor while keeping constant the speed of the component transported in continuous operation by the first transporting conveyor. Thereby, the component transported can be discharged correctly and safely in a desired position.

In addition, at this time, when the separation and recovery apparatus further includes a placing platform for placing the component dropped in a predetermined position from the second electromagnetic conveyor, since the component is piled on the placing platform, the component is easily discharged as a stack.

In the separation and recovery apparatus of the present invention, when a scrap separation conveyor is further included between the first transporting conveyor and the second transporting conveyor, for example, in such a case that the robot fails to take out the inner offcut or the inner offcut is too small for the robot to grasp, the inner offcut can be dropped by the scrap separation conveyor.

In the separation and recovery apparatus of the present invention, the inner offcut can be further cut into a separate component and a residual offcut by the laser blanking apparatus. Thereby, it is possible to obtain the separate component efficiently while reducing a discarded portion of the sheet material as much as possible.

At this time, by making the robot to grasp the separate component and the residual offcut, and recovering the separate component while dropping the residual offcut into the scrap chute, the separate component can be efficiently recovered.

In the separation and recovery apparatus of the present invention, when a washing machine for washing the component is further included between the laser blanking apparatus and the first transporting conveyor, the occurrence of such a trouble as failure of the robot to grasp the component or the inner offcut because of oil or the like attached to the component or the inner offcut, or the like, can be suppressed.

In addition, at this time, an impurity such as fume or spatters occurring during laser cutting can also be removed, so that a flaw due to the impurity can be prevented from occurring during press forming in a subsequent step.

In the separation and recovery apparatus of the present invention, since the laser blanking apparatus includes: the laser nozzle emitting a laser beam to the sheet material; the pair of upstream support roller and downstream support roller installed below the laser nozzle; the pull-in roller installed below the upstream support roller and the downstream support roller; and the endless conveyor guided by the upstream support roller, the downstream support roller, and the pull-in roller to transport the sheet material, a sufficient space can be formed between the upstream support roller and the downstream support roller below the laser nozzle. Thereby, the endless conveyor can be prevented from being damaged by the laser beam even when laser processing is performed with the laser nozzle since a fixed space exists immediately below the sheet material subjected to laser processing. It should be noted that such a space can be formed in an arbitrary position, so that the processing position is not restricted.

In addition, since a laser beam is emitted to the sheet material from the laser nozzle while the laser nozzle is being moved, and the upstream support roller, the downstream support roller, and the pull-in roller are made to follow the movement of the laser nozzle, it is possible to perform laser processing while moving the laser nozzle itself widely forward and backward. That is, a region capable of laser processing can be widely extended, and thereby the transportation speed of the sheet material can also be increased.

In the separation and recovery apparatus of the present invention, since the x-axis rail is attached above the endless conveyor of the laser blanking apparatus orthogonally to an advancing direction of the endless conveyor, the y-axis rails are attached on both right and left ends of the endless conveyor along the advancing direction of the endless conveyor, the laser nozzle is capable of moving while being guided on the x-axis rail, and the x-axis rail is capable of moving while being guided on the y-axis rails, by making full use of these members in combination, the laser nozzle can be moved in any directions, such as forward and backward, rightward and leftward, diagonally, or curvedly. Thereby, the sheet material transported can also be laser-processed into a complicated shape.

In the separation and recovery apparatus of the present invention, since the spatter receiving box is installed between the upstream support roller and the downstream support roller of the laser blanking apparatus, spatters occurring during laser processing can also be collected.

In the method of taking out a component of the present invention, since the laser processing step, the first transporting step, the dropping step, the removing step, and the second transporting step are performed in continuous operation using the separation and recovery apparatus described above, a component can be efficiently continuously taken out even when the sheet material is divided into the component, an inner offcut located inside the component, and a marginal offcut located on an edge side of the component.

In addition, by further including the piling step, the component can be discharged as a stack of components piled.

At this time, by performing the laser processing step while transporting the sheet material, the productive efficiency can be further improved, and the facilities can also be made more compact.

DESCRIPTION OF EMBODIMENTS

Figure 1:
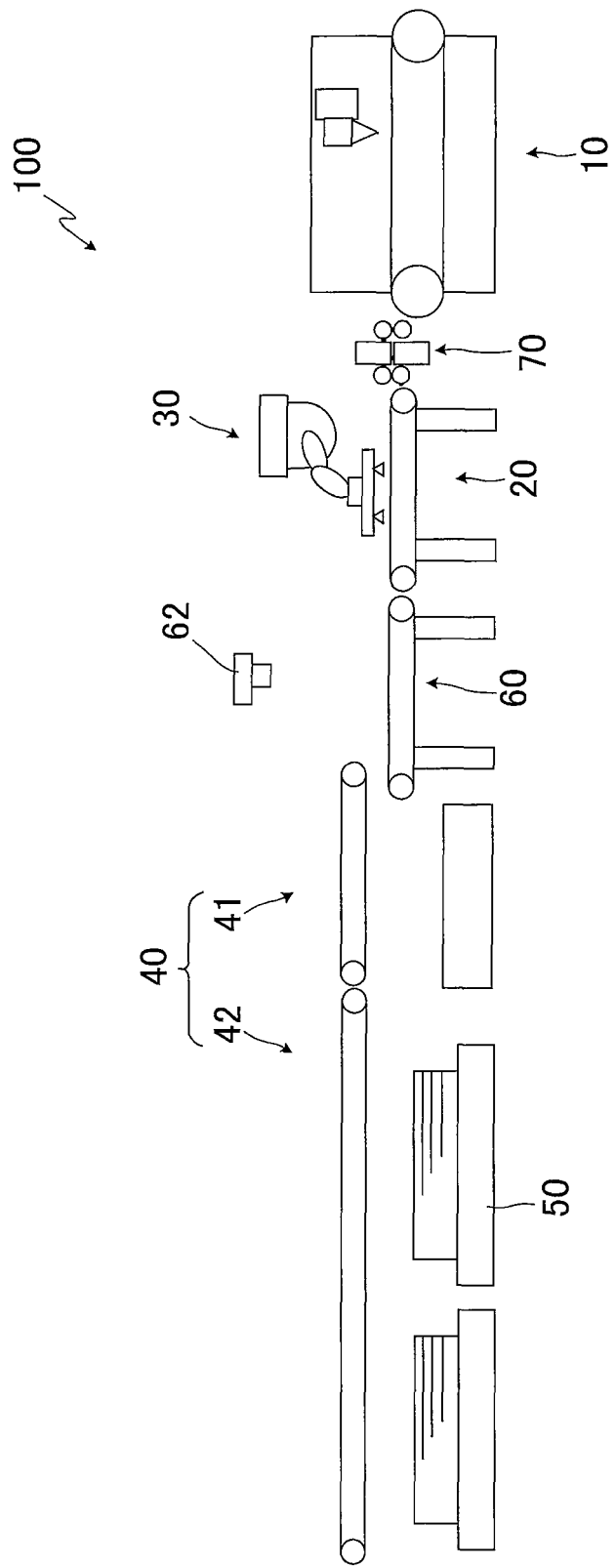
FIG. 1 is a side view schematically showing a separation and recovery apparatus according to the present embodiment.

Hereinafter, with reference to the drawings, if necessary, preferred embodiments of the present invention will be described in detail. It should be noted that, in the drawings, a same element is denoted by a same reference sign so that an overlapping description will be omitted. In addition, a positional relationship, such as up, down, right, or left, are based on a positional relationship shown in the drawings, unless otherwise noted. Further, the dimensional ratios of the drawings are not limited to the ratios shown.

FIG. 1 is a side view schematically showing a separation and recovery apparatus according to the present embodiment.

As shown in FIG. 1, a separation and recovery apparatus 100 according to the present embodiment is provided with a laser blanking apparatus 10, a first transporting conveyor 20, a robot 30, a scrap separation conveyor 60, a second transporting conveyor 40 composed of a first electromagnetic conveyor 41 and a second electromagnetic conveyor 42, and a placing platform 50.

In the separation and recovery apparatus 100, a flat plate-like sheet material is cut into a component having a desired shape by the laser blanking apparatus 10, and an inner offcut and a marginal offcut, which are discarded portions, are removed by the first transporting conveyor 20, the robot 30, and the scrap separation conveyor 60 while the component is being transported.

For this reason, according to the separation and recovery apparatus 100, only the component can be efficiently continuously taken out.

The laser blanking apparatus 10 is an apparatus that cuts a flat plate-like sheet material with a laser beam emitted from a laser nozzle 11 while transporting the sheet material, and that divides the sheet material into a component having a desired shape, an inner offcut located in isolation inside the component, and a marginal offcut opened and located on an edge side of the component. For this reason, the laser blanking apparatus 10 has high cutting efficiency and excellent productivity.

Herein, as a type of laser beam, for example, a solid-state laser, liquid laser, gas laser, semiconductor laser, free electron laser, metal vapor laser, chemical laser, or the like, can be used, though the laser is not limited to these lasers.

In addition, as a sheet material, not only such metal as iron, aluminum, titanium, or magnesium, but also glass, ceramics, resin, a composite material of these, or the like, may be used as long as they can be cut with a laser beam.

Figure 2:
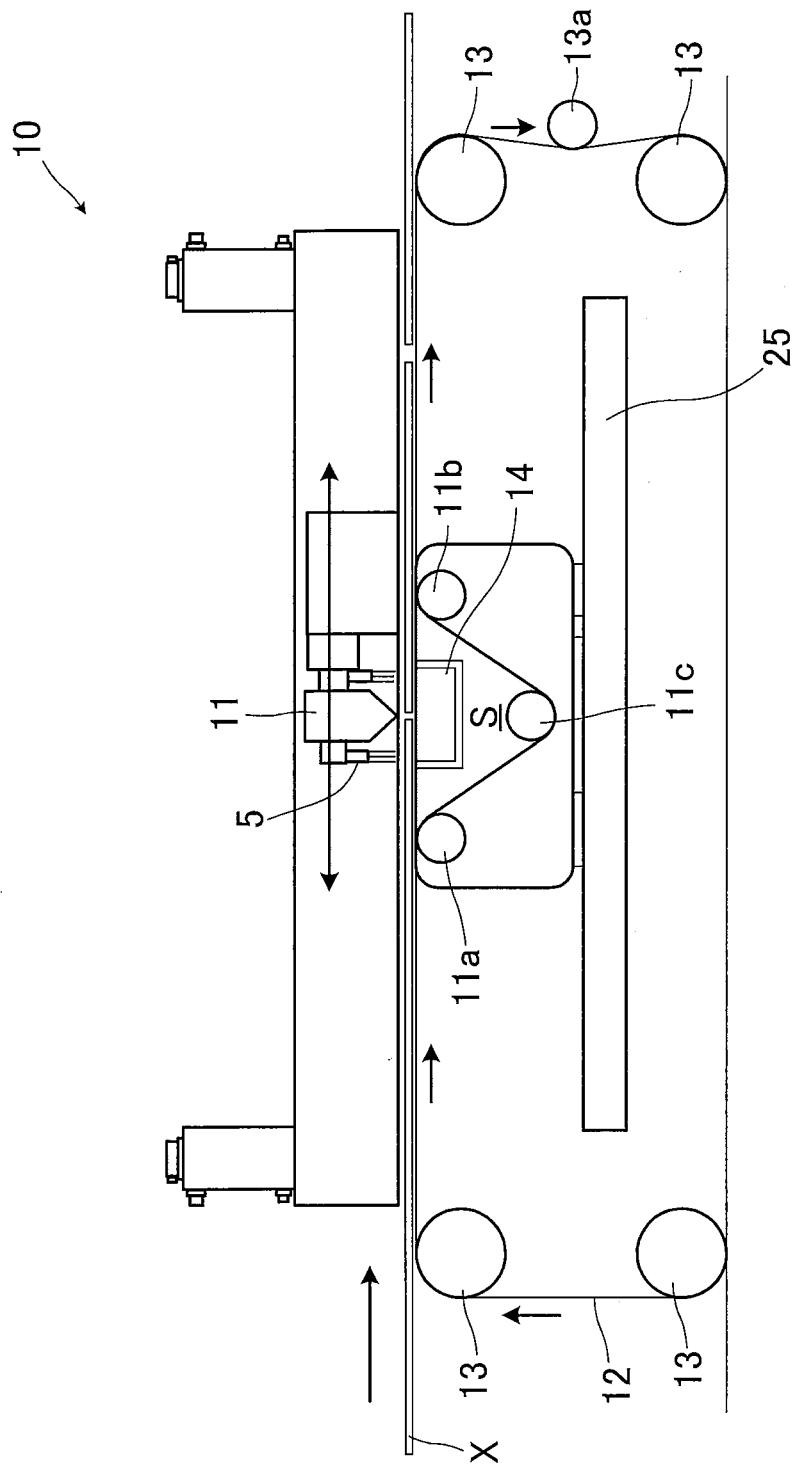
FIG. 2 is a side view schematically showing a laser blanking apparatus of a separation and recovery apparatus according to the present embodiment.

FIG. 2 is a side view schematically showing a laser blanking apparatus of a separation and recovery apparatus according to the present embodiment.

As shown in FIG. 2, the laser blanking apparatus 10 is provided with a laser nozzle 11 emitting a laser beam to a sheet material X, a vibration preventing means 5 for suppressing vibration of the sheet material X during laser processing, a pair of upstream support roller 11a and downstream support roller 11b installed below the laser nozzle 11, a pull-in roller 11c installed below the upstream support roller 11a and the downstream support roller 11b, an endless conveyor 12 guided by the upstream support roller 11a, the downstream support roller 11b, and the pull-in roller 11c to transport the sheet material, a tension adjusting roller 13a for adjusting the tension of the endless conveyor 12, and a spatter receiving box 14 installed in a space S between the upstream support roller 11a and the downstream support roller 11b.

In addition, in the laser blanking apparatus 10, the endless conveyor 12 is guided by a plurality of guide rollers 13, the upstream support roller 11a, the downstream support roller 11b, and the pull-in roller 11c.

In the laser blanking apparatus 10, the sheet material X is transported from the upstream side to the downstream side by the endless conveyor 12, and subjected to laser processing by the laser nozzle 11 on the endless conveyor 12. At this time, a laser beam is emitted to the sheet material X from the laser nozzle 11 while the laser nozzle 11 is being moved, and simultaneously the upstream support roller 11a, the downstream support roller 11b, and the pull-in roller 11c are made to follow the movement of the laser nozzle 11. Thereby, laser processing can be performed while the laser nozzle 11 itself is being moved widely forward and backward. That is, a range capable of laser processing can be widely extended, and thereby the transportation speed of the sheet material can also be increased.

In addition, since there is the fixed space S immediately below the sheet material X subjected to laser processing, the endless conveyor 12 can be prevented from being damaged by a laser beam even when laser processing is performed with the laser nozzle 11. It should be noted that such a space can be formed in an arbitrary position, so that the processing position is not limited.

In the laser blanking apparatus 10, the vibration preventing means 5 is attached so as to surround the laser nozzle 11.

In addition, the vibration preventing means 5 applies contact pressure to the sheet material, thereby suppressing vibration of a blank material during laser processing. Further, the vibration preventing means 5 is fixed to a frame having the laser nozzle 11 attached, and moves horizontally with the laser nozzle 11.

In the laser nozzle 11 of the laser blanking apparatus 10, though characterized by the capability of moving in any directions, forward and backward, rightward and leftward, and diagonally, the laser nozzle 11 has an advantage that vibration can be suppressed in all directions so that laser processing can be performed precisely since the vibration preventing means 5 is installed around the laser nozzle 11 in this manner.

It should be noted that such a vibration preventing means 5 may be, but not limited to, for example, a contact pressure brush, or the like.

In the laser blanking apparatus 10, the spatter receiving box 14 is installed in the space S formed by the upstream support roller 11a, the downstream support roller 11b, and the pull-in roller 11c. That is, the spatter receiving box 14 is disposed in the space S between the laser nozzle 11 and the endless conveyor 12.

The spatter receiving box 14 has a box-like shape extending in a direction orthogonal to an advancing direction of the endless conveyor 12 (that is, a direction transverse to the endless conveyor 12), and can collect spatters occurring during laser processing.

Figure 3:
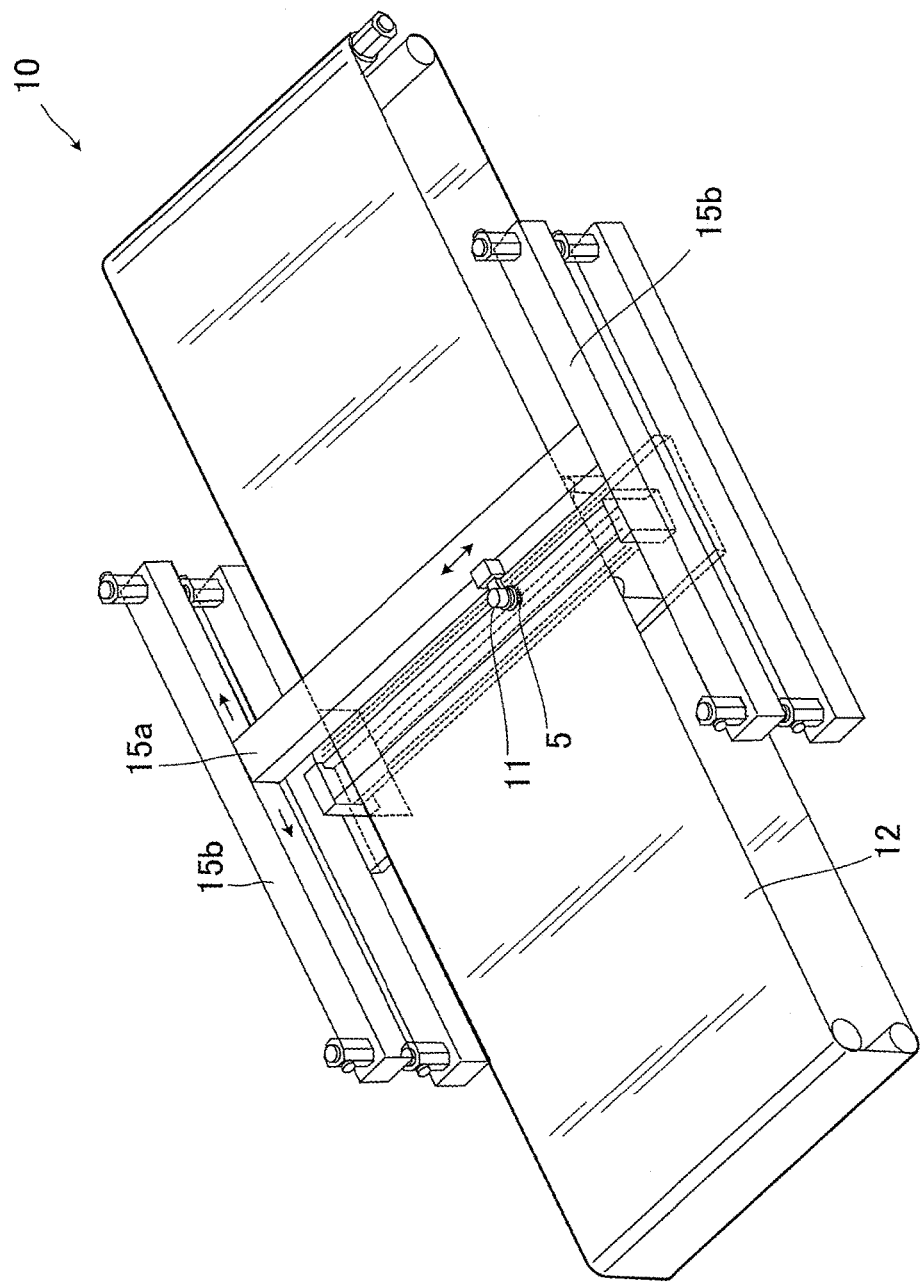
FIG. 3 is a perspective view roughly showing a laser blanking apparatus of a separation and recovery apparatus according to the present embodiment.

FIG. 3 is a perspective view roughly showing a laser blanking apparatus of a separation and recovery apparatus according to the present embodiment. It should be noted that the sheet material 1 is omitted in FIG. 3.

As shown in FIG. 3, in the laser blanking apparatus 10, an X-axis rail 15a is attached above the endless conveyor 12 orthogonally to the advancing direction of the endless conveyor 12, and the laser nozzle 11 can move while being guided on the X-axis rail 15a.

In addition, a pair of Y-axis rails 15b are attached on the right and left ends of the endless conveyor 12 along the advancing direction of the endless conveyor 12, and the X-axis rail 15a can move while being guided on the Y-axis rails 15b.

For this reason, in the laser blanking apparatus 10, by programmatically controlling these movements in combination, the sheet material transported can be subjected to laser processing in any directions, such as forward and backward, rightward and leftward, diagonally, or curvedly.

Figure 4:
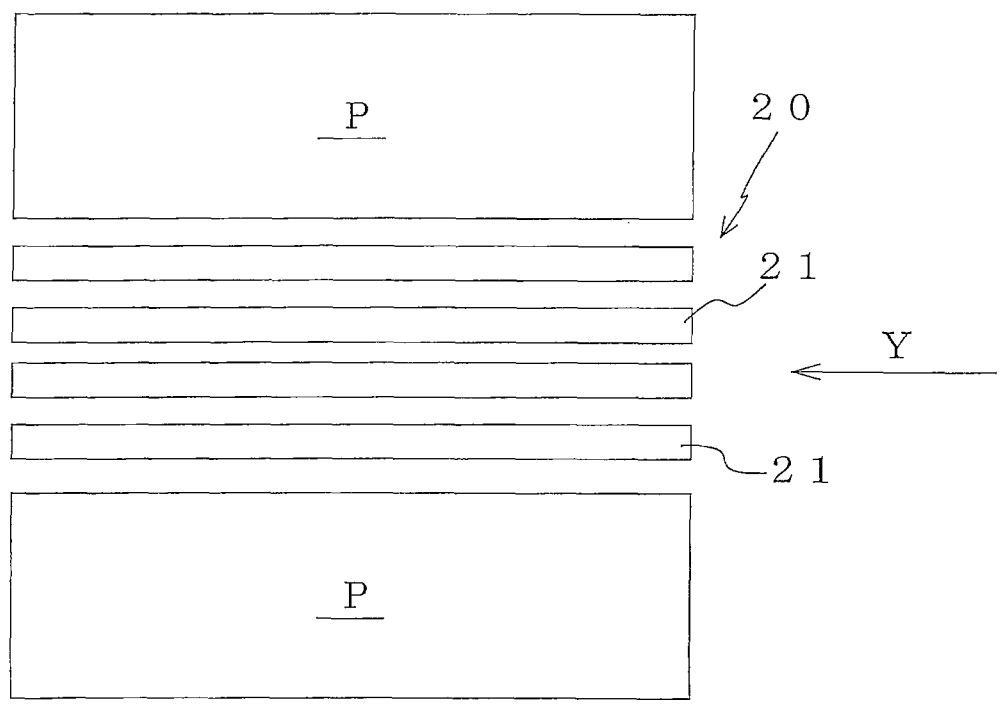
FIG. 4 is a top view schematically showing a first transporting conveyor of a separation and recovery apparatus according to the present embodiment.

FIG. 4 is a top view schematically showing a first transporting conveyor of a separation and recovery apparatus according to the present embodiment.

As shown in FIG. 4, the first transporting conveyor 20 is composed of a plurality of endless belts 21 extending rightward and leftward defined in FIG. 4.

In addition, scrap chutes P are installed on both sides of the first transporting conveyor 20.

In the first transporting conveyor, a component, an inner offcut, and a marginal offcut, not shown, are transported according to turning of the plurality of endless belts 21 while being placed on the endless belts 21.

At this time, the width of the first transporting conveyor 20 (a width in a direction perpendicular to a component transporting direction Y) is narrower than the width of the sheet material (a width in a direction perpendicular to a component transporting direction Y). For this reason, among the component, the inner offcut, and the marginal offcuts cut by the laser blanking apparatus, the marginal offcuts located on the edge sides drop into the scrap chutes P on both the sides of the first transporting conveyor 20.

Figure 5:
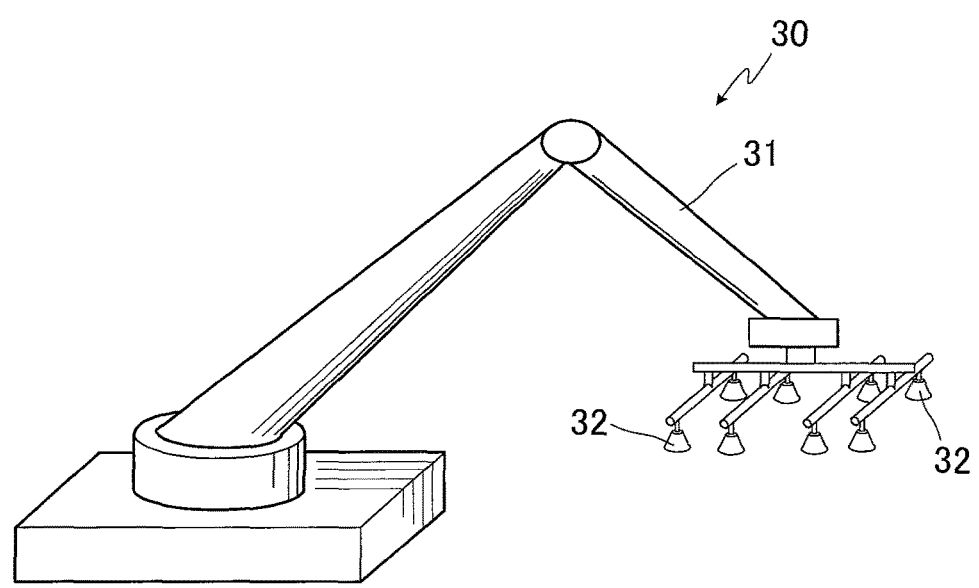
FIG. 5 is a perspective view roughly showing a robot of a separation and recovery apparatus according to the present embodiment.

FIG. 5 is a perspective view roughly showing a robot of a separation and recovery apparatus according to the present embodiment.

As shown in FIG. 5, the robot 30 used is preferably of an arm type.

The robot 30 can grasp with an arm 31 and take out the inner offcut which is not dropped and not removed on the first transporting conveyor 20.

Herein, a plurality of vacuum cups 32 are attached to the arm 31 of the robot 30. These vacuum cups 32 can individually perform suction and holding, respectively. Thereby, when the inner offcut is cut and separated into a separate component and a residual offcut, it is possible to grasp both the separate component and the residual offcut simultaneously, and transport and recover only the separate component while dropping the residual offcut into the scrap chute P by controlling ON/OFF of suction between one vacuum cup 32 grasping the separate component and another vacuum cup 32 grasping the residual offcut.

Therefore, in this case, a separate component can also be taken out from the inner offcut that is a discarded portion, so that a discarded portion of the sheet material can be reduced as much as possible, and the separate component can be efficiently obtained.

Figure 6:
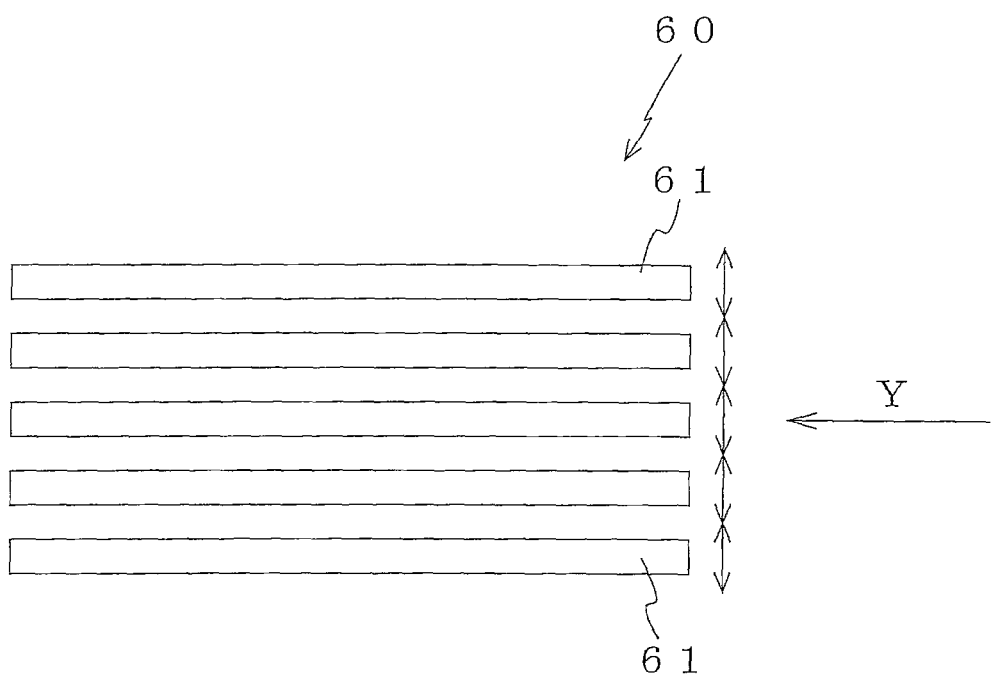
FIG. 6 is a top view schematically showing a scrap separation conveyor of a separation and recovery apparatus according to the present embodiment.

FIG. 6 is a top view schematically showing a scrap separation conveyor of a separation and recovery apparatus according to the present embodiment.

As shown in FIG. 6, the scrap separation conveyor 60 is composed of a plurality of endless belts 61 extending rightward and leftward defined in FIG. 6.

In addition, a scrap chute, not shown, is installed below the scrap separation conveyor 60.

In the scrap separation conveyor 60, the component and the inner offcut are transported according to turning of the plurality of endless belts 61 while being placed on the endless belts 61.

It should be noted that the component is not dropped because the width of the scrap separation conveyor 60 (a width in a direction perpendicular to a component transporting direction) is greater than the width of the component (a width in a direction perpendicular to a component transporting direction).

In the scrap separation conveyor 60, the plurality of endless belts 61 constituting the scrap separation conveyor 60 are individually movable in a direction perpendicular to the component transporting direction Y.

Therefore, for example, in such a case that the robot described above fails to take out the inner offcut or the inner offcut is too small for the robot to grasp, it is possible to drop and remove the inner offcut into the scrap chute, not shown, since the inner offcut is made to move on the endless belts 61 and a space is provided between adjacent endless belts 61.

With reference to FIG. 1 again, a CCD camera 62 is installed above the scrap separation conveyor 60.

Therefore, the position of the component or whether or not the inner offcut remains on the scrap separation conveyor 60 can be checked through the CCD camera.

The second transporting conveyor 40 is composed of the first electromagnetic conveyor 41 magnetically attracting to a lower face and transporting the component handed from the scrap separation conveyor 60, and the second electromagnetic conveyor 42 magnetically attracting to a lower face and transporting the component handed from the first electromagnetic conveyor 41. For this reason, by controlling ON/OFF of magnetic force, the component can be dropped and recovered at a desired position.

The placing platform 50 is a platform on which the component dropped in a predetermined position from the second electromagnetic conveyor is placed, and, for example, a known conveyor, pallet, lifter, or the like, can be used according to the situation.

Since the placing platform 50 is installed, the components are easily discharged as a stack by piling the components on the placing platform 50.

A washing machine 70 is an apparatus that is installed between the laser blanking apparatus 10 and the first transporting conveyor 20 to wash the components.

Since the washing machine 70 is installed, it is possible to remove oil or the like attached to the component or the inner offcut. Thereby, the occurrence of such a trouble as failure of the robot to grasp the inner offcut because of an impurity can be suppressed.

In addition, an impurity, such as fume or spatters occurring during laser cutting, can also be removed, so that a flaw due to the impurity can be prevented from occurring during press forming in a subsequent step.

Next, a method of taking out a component according to the present embodiment will be described.

The method of taking out a component according to the present embodiment is a method of taking out component that uses the separation and recovery apparatus 100 described above, and that takes out a laser-processed component and a separate component from a flat plate-like sheet material.

Figure 7:
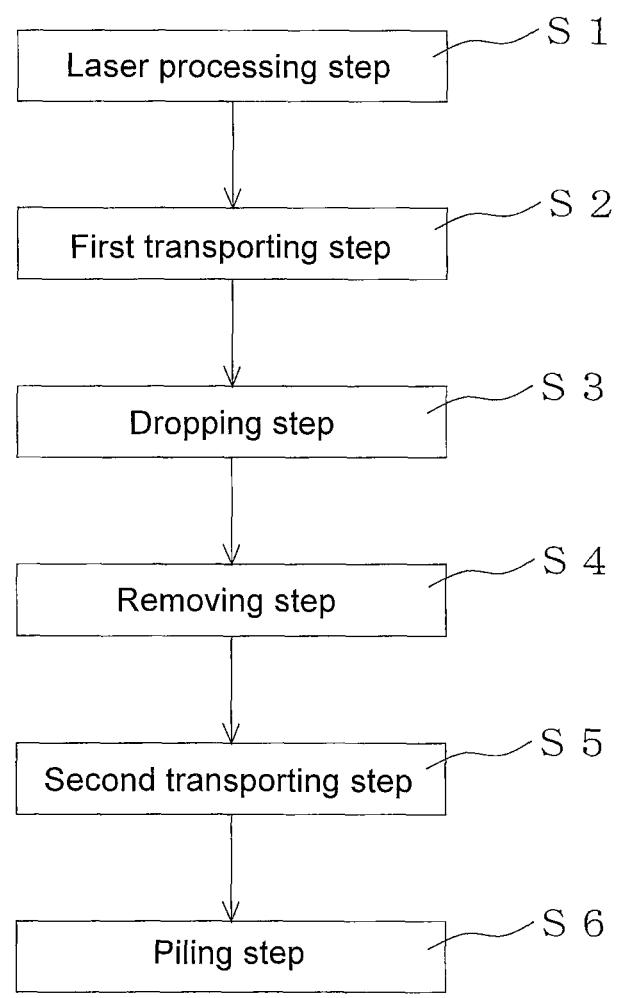
FIG. 7 is a flowchart showing a method of taking out component according to the present embodiment.

FIG. 7 is a flowchart showing a method of taking out component according to the present embodiment.

As shown in FIG. 7, a method of taking out a component according to the present embodiment is provided with a laser processing step S1, a first transporting step S2, a dropping step S3, a removing step S4, a second transporting step S5, and a piling step S6.

According to the method of taking out a component, even when the sheet material is divided into a component, an inner offcut located inside the component, and a marginal offcut located on an edge side of the component, the component can be efficiently continuously taken out.

FIGS. 8(a) to 8(f) are illustrative views for illustrating a method of taking out component according to the present embodiment.

Figure 8A:
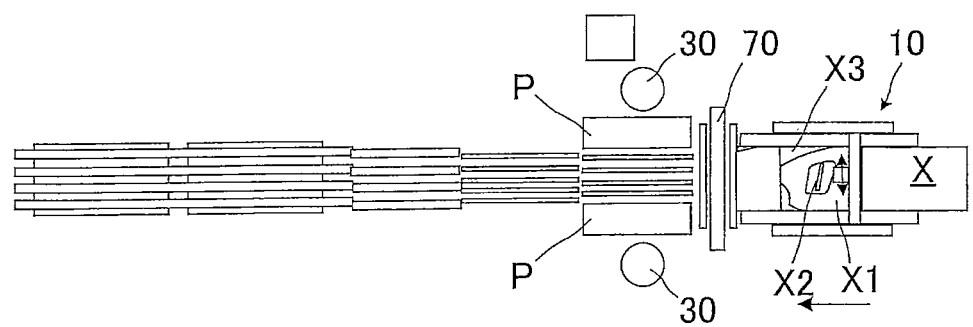
FIG. 8(a) is an illustrative view for illustrating a method of taking out a component according to the present embodiment.

As shown in FIG. 8(a), in the laser processing step S1, the sheet material is cut with a laser beam of the laser blanking apparatus 10, and divided into a component X1, an inner offcut X2 located in isolation inside the component X1, and a marginal offcut X3 opened and located on an edge side of the component X1.

In addition, the inner offcut X2 is divided into a separate component X21 and a residual offcut X22 located on a peripheral edge of the separate component X21 (see FIG. 9).

It should be noted that, in the laser processing step S1, since the laser blanking apparatus 10 described above is used, laser processing is performed in any directions, such as forward and backward, rightward and leftward, diagonally, or curvedly, while the sheet material is being transported. Thereby, the productive efficiency is further improved.

Then, the component X1, the inner offcut X2 (the separate component X21 and the residual offcut X22), and the marginal offcut X3, which have been cut and separated by laser processing, are washed by the washing machine 70.

Figure 8B:
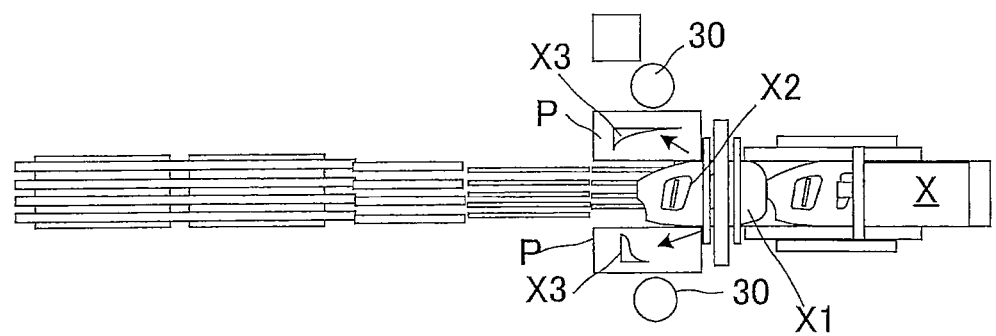
FIG. 8(b) is an illustrative view for illustrating a method of taking out a component according to the present embodiment.

Next, as shown in FIG. 8(b), in the first transporting step S2, the component X1, the inner offcut X2, and the marginal offcut X3 are transported by the first transporting conveyor 20.

Then, in the dropping step S3, the marginal offcut X3 is dropped while the component X1 is being transported. That is, as described above, since the width of the first transporting conveyor 20 is narrower than the width of the sheet material, the marginal offcuts X3 located on both sides of the sheet material X are dropped and removed into the scrap chutes P.

Figure 8C:
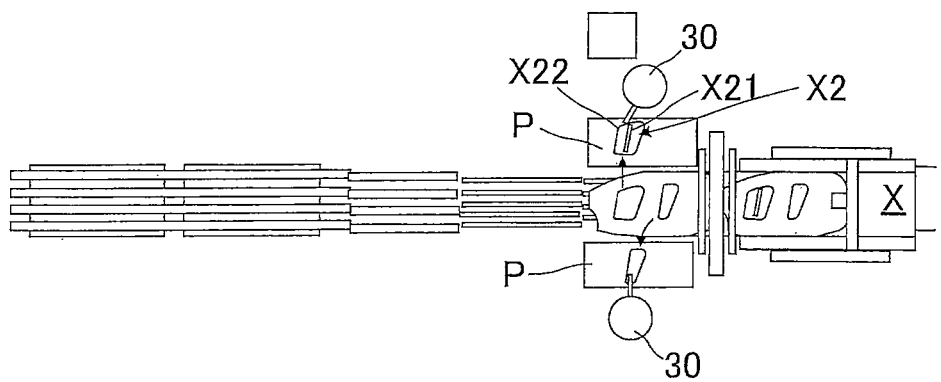
FIG. 8(c) is an illustrative view for illustrating a method of taking out a component according to the present embodiment.

Next, as shown in FIG. 8(c), in the removing step S4, the inner offcut X2 is removed by the robot 30 while the component X1 is being transported.

At this time, since the inner offcut X2 are cut and separated into the separate component X21 and the residual offcut X22, the separate component X21 and the residual offcut X22 are simultaneously grasped by the robot 30, and only the residual offcut X22 is dropped into the scrap chute P.

Figure 8D:
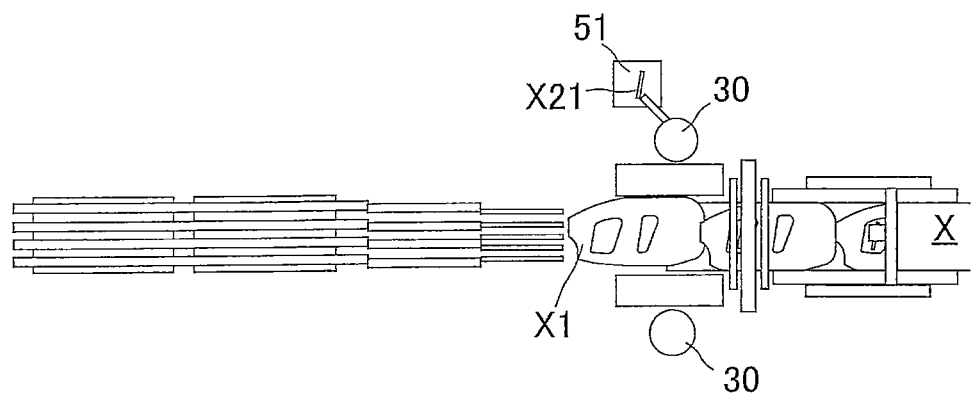
FIG. 8(d) is an illustrative view for illustrating a method of taking out a component according to the present embodiment.

Then, as shown in FIG. 8(d), by further transporting only the separate component X21 by the robot 30, and placing the separate component X21 on a separate component placing platform 51, the separate component X21 needed can be separated and recovered from the inner offcut X2 that is essentially a discarded portion.

It should be noted that, as in the case of the placing platform 50 described above, a known conveyor, pallet, lifter, or the like, for example, is used as the separate component placing platform 51 according to the situation.

Figure 8E:
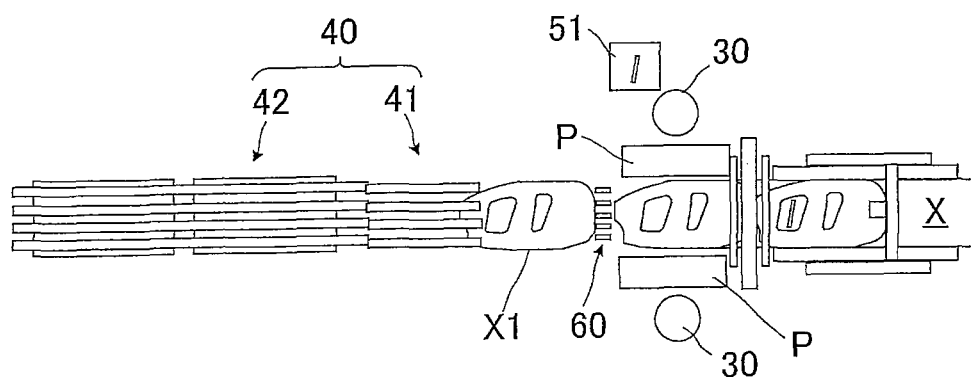
FIG. 8(e) is an illustrative view for illustrating a method of taking out a component according to the present embodiment.

Next, as shown in FIG. 8(e), the component X1 from which the inner offcut X2 and the marginal offcut X3 have been removed is transported by the scrap separation conveyor 60.

It should be noted that, if necessary, the inner offcut can be dropped into the scrap chute by moving the endless belts 61 of the scrap separation conveyor 60 widthwise.

Then, in the second transporting step S5, the component X1 is transported in such a manner that the component X1 is handed from the top of the scrap separation conveyor 60 so as to be magnetically attracted to a lower face of the first electromagnetic conveyor 41 (the second transporting conveyor 40), and further handed from the first electromagnetic conveyor 41 to the second electromagnetic conveyor 42.

Herein, the first electromagnetic conveyor 41 transports the component in continuous operation, and the second electromagnetic conveyor 42 transports the component in intermittent operation.

That is, the first electromagnetic conveyor 41 magnetically attracts to the lower face the component continuously transported at a constant speed from the laser blanking apparatus 10 to the scrap separation conveyor 60, and transports the component at a higher speed than the constant speed. Thereby, a space can be provided between the components adjacent to each other, so that the second electromagnetic conveyor 42 can transport the component handed from the first electromagnetic conveyor 41 in intermittent operation.

Therefore, in the second transporting conveyor 40, the first electromagnetic conveyor 41 adjusts the transportation speed, thereby making it possible to adapt the speed of the component transported in continuous operation on the first electromagnetic conveyor 41 and the speed of recovery of the component by the second electromagnetic conveyor 42 to each other and keep the speeds constant. As a result, the component transported can be discharged correctly and safely in a desired position.

Figure 8F:
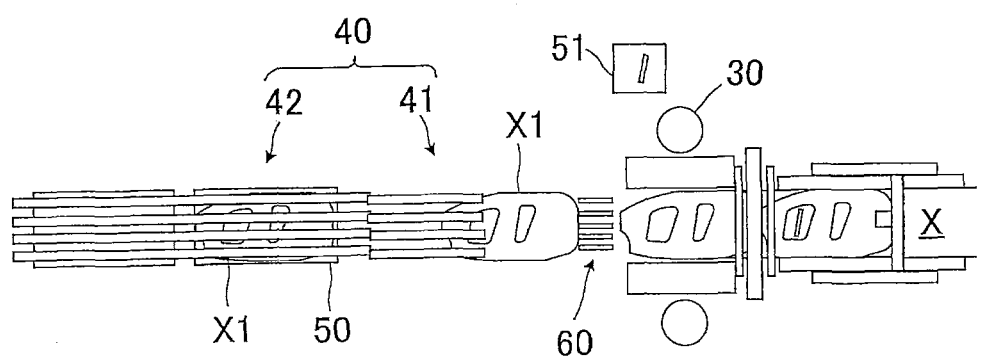
FIG. 8(f) is an illustrative view for illustrating a method of taking out a component according to the present embodiment.

Next, as shown in FIG. 8(f), in the piling step, once the component X1 transported reaches a position corresponding to the placing platform 50, the component X is dropped by turning off the magnetic force of the second electromagnetic conveyor 42, and piled on the placing platform 50 below. Thereby, the component X1 can be discharged as a stack of the components piled.

In the method of taking out the component X1 according to the present embodiment, since the laser processing step S1, the first transporting step S2, and the dropping step S3 are performed in continuous operation, it is possible to divide the sheet material into a component, an inner offcut located inside the component, and a marginal offcut located on an edge side of the component, and efficiently continuously take out the component among them.

Hereinabove, the preferred embodiments of the present invention have been described, but the present invention is not limited to the embodiments described above.

For example, the separation and recovery apparatus 100 according to the present embodiment is provided with the scrap separation conveyor 60, but the scrap separation conveyor 60 is not necessarily essential.

In addition, the second transporting conveyor 40 is composed of the first electromagnetic conveyor 41 and the second electromagnetic conveyor 42, however, the second transporting conveyor 40 is not limited to this combination.

In the separation and recovery apparatus 100 according to the present embodiment, the inner offcut is cut into a separate component and a residual offcut, and the separate component is also taken out, however, the separate component does not necessarily have to be further taken out.

Figure 9A:
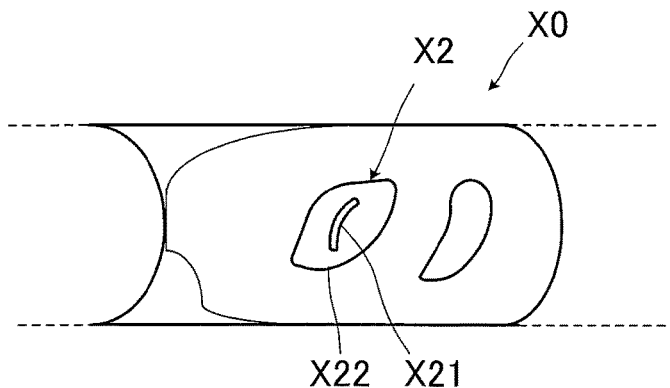
FIG. 9(a) is a conceptual view for illustrating a sheet material separation method in a method of taking out a component according to the present embodiment.
Figure 9B:
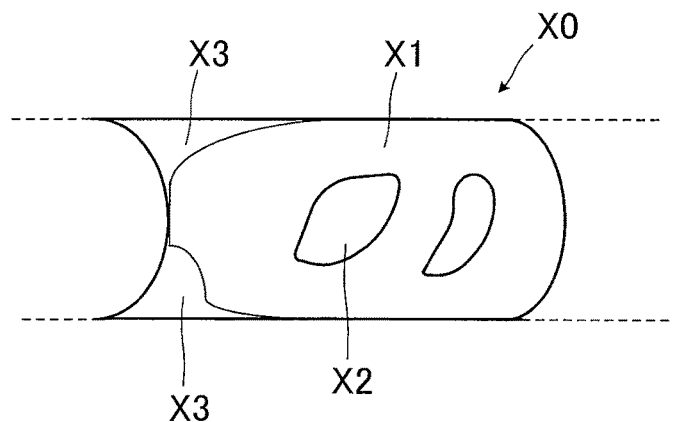
FIG. 9(b) is a conceptual view for illustrating a sheet material separation method in a method of taking out a component according to another embodiment.

FIG. 9(a) is a conceptual view for illustrating a sheet material separation method in a method of taking out component according to the present embodiment, and FIG. 9(b) is a conceptual view for illustrating a sheet material separation method in a method of taking out component according to another embodiment.

As shown in FIG. 9(a), in the method of taking out component according to the present embodiment, the inner offcut X2 in a unit X0 is cut into the separate component X21 and the residual offcut X22 by the laser blanking apparatus.

Further, after the inner offcut X2 is taken out, the residual offcut X22 is removed, and the separate component X21 is recovered.

However, as shown in FIG. 9(b), the inner offcut does not have to be cut into a separate component and a residual offcut. In a method of taking out component according to another embodiment, the component X1 is obtained by removing the inner offcut X2 and the marginal offcut X3 from the unit X0.

In the separation and recovery apparatus 100 according to the present embodiment, as shown in FIG. 1 or 8, the laser blanking apparatus 10, the washing machine 70, the first transporting conveyor 20, the scrap separation conveyor 60, and the second transporting conveyor 40 are arranged in a line in this order, and the robots 30 are disposed on both sides of the first transporting conveyor 20, but the arrangement of them or the disposed positions of the robots are not limited to these ones.

For example, a scrap may be separated or washing may be performed after the product is taken out.

INDUSTRIAL APPLICABILITY

The present invention is a separation and recovery apparatus capable of continuously separating and recovering a laser-processed component from a flat plate-like sheet material. The component, for example, can be press-formed, thereby being used as an automobile component.

REFERENCE SIGNS LIST

5 Vibration preventing means
10 Laser blanking apparatus
11 Laser nozzle
11a Upstream support roller
11b Downstream support roller 11c Pull-in roller
12 Endless conveyor
13 Guide roller
13a Tension adjustment roller
14 Spatter receiving box
15a X-axis rail
15b Y-axis rail
20 First transporting conveyor
21 Endless belt
30 Robot
31 Arm
32 Vacuum cup
40 Second transporting conveyor
41 First electromagnetic conveyor
42 Second electromagnetic conveyor
50 Placing platform
60 Scrap separation conveyor
100 Separation and recovery apparatus
P Scrap chute
S Space
S1 Laser processing step
S2 First transporting step
S3 Dropping step
S4 Removing step
S5 Second transporting step
S6 Piling step
X Sheet material
X0 Unit
X1 Component
X2 Inner offcut
X21 Separate component
X22 Residual offcut
X3 Marginal offcut
Y Component transporting direction

The invention claimed is:

1. A separation and recovery apparatus comprising:
a laser blanking apparatus cutting a flat plate-like sheet material with a laser beam and dividing the sheet material into a component, an inner offcut located in isolation inside the component, and a marginal offcut opened and located on an edge side of the component;
a first transporting conveyor dropping the marginal offcut into a scrap chute while transporting the component, the inner offcut, and the marginal offcut;
a robot taking out and removing the inner offcut on the first transporting conveyor; and
a second transporting conveyor transporting the component.

2. The separation and recovery apparatus according to claim 1, wherein
the second transporting conveyor comprises a first electromagnetic conveyor magnetically attracting the component to a lower face, and a second electromagnetic conveyor receiving the component handed from the first electromagnetic conveyor and magnetically attracting the component to a lower face, wherein
the first electromagnetic conveyor transports the component in continuous operation, and wherein
the second electromagnetic conveyor transports the component in intermittent operation.

3. The separation and recovery apparatus according to claim 2, further comprising a placing platform for placing the component dropped in a predetermined position from the second electromagnetic conveyor.

4. The separation and recovery apparatus according to claim 1, further comprising
a scrap separation conveyor capable of dropping the inner offcut between the first transporting conveyor and the second transporting conveyor, wherein
the component is handed from the scrap separation conveyor to the second transporting conveyor.

5. The separation and recovery apparatus according to claim 1, wherein
the inner offcut is cut into a separate component and a residual offcut, wherein
the robot grasps the separate component and the residual offcut, and recovers the separate component while dropping the residual offcut into the scrap chute.

6. The separation and recovery apparatus according to claim 1, further comprising a washing machine for washing the component between the laser blanking apparatus and the first transporting conveyor.

7. The separation and recovery apparatus according to claim 1, wherein
the laser blanking apparatus comprises:
a laser nozzle emitting a laser beam to the sheet material;
a pair of upstream support roller and downstream support roller installed below the laser nozzle;
a pull-in roller installed below the upstream support roller and the downstream support roller; and
an endless conveyor guided by the upstream support roller, the downstream support roller, and the pull-in roller to transport the sheet material, and wherein
a laser beam is emitted to the sheet material from the laser nozzle while the laser nozzle is being moved, and the upstream support roller, the downstream support roller, and the pull-in roller are made to follow the movement of the laser nozzle.

8. The separation and recovery apparatus according to claim 7, wherein
an x-axis rail is attached above the endless conveyor orthogonally to an advancing direction of the endless conveyor, wherein
y-axis rails are attached on both right and left ends of the endless conveyor along the advancing direction of the endless conveyor, wherein
the laser nozzle is capable of moving while being guided on the x-axis rail, and wherein
the x-axis rail is capable of moving while being guided on the y-axis rails.

9. The separation and recovery apparatus according to claim 7, wherein
a spatter receiving box is installed between the upstream support roller and the downstream support roller.

10. A component-taking-out method of taking out a laser-processed component from a flat plate-like sheet material using the separation and recovery apparatus according to claim 1, comprising:
a laser processing step of cutting the sheet material with a laser beam and dividing the sheet material into a component, an inner offcut located in isolation inside the component, and a marginal offcut opened and located on an edge side of the component;
a first transporting step of transporting the component, the inner offcut, and the marginal offcut;
a dropping step of dropping the marginal offcut while transporting the component;
a removing step of removing the inner offcut by means of a robot while transporting the component;
a second transporting step of transporting the component, wherein the laser processing step, the first transporting step, and the dropping step are performed in continuous operation.

11. The method of taking out a component according to claim 10, further comprising a piling step of dropping and piling the component.

12. The method of taking out a component according to claim 10, wherein the laser processing step is performed while the sheet material is being transported.

* * * * *